(12) United States Patent
Xu et al.

(10) Patent No.: US 12,182,434 B2
(45) Date of Patent: Dec. 31, 2024

(54) METHOD AND APPARATUS FOR DATA ACCESS OF NAND FLASH FILE, AND STORAGE MEDIUM

(71) Applicant: HANGZHOU EZVIZ SOFTWARE CO., LTD., Hangzhou (CN)

(72) Inventors: Shixiong Xu, Hangzhou (CN); Lei Guo, Hangzhou (CN); Dongfeng Zhou, Hangzhou (CN)

(73) Assignee: HANGZHOU EZVIZ SOFTWARE CO., LTD., Hangzhou (CN)

( * ) Notice: Subject to any disclaimer, the term of this patent is extended or adjusted under 35 U.S.C. 154(b) by 0 days.

(21) Appl. No.: 17/995,459

(22) PCT Filed: Mar. 23, 2021

(86) PCT No.: PCT/CN2021/082457
§ 371 (c)(1),
(2) Date: Oct. 4, 2022

(87) PCT Pub. No.: WO2021/203964
PCT Pub. Date: Oct. 14, 2021

(65) Prior Publication Data
US 2023/0168830 A1 Jun. 1, 2023

(30) Foreign Application Priority Data
Apr. 7, 2020 (CN) .......................... 202010263561.6

(51) Int. Cl.
*G06F 3/06* (2006.01)
(52) U.S. Cl.
CPC .......... *G06F 3/0644* (2013.01); *G06F 3/0604* (2013.01); *G06F 3/0679* (2013.01)
(58) Field of Classification Search
CPC ..... G06F 3/0644; G06F 3/0604; G06F 3/0679
(Continued)

(56) References Cited

U.S. PATENT DOCUMENTS 9,009,565 B1 * 4/2015 Northcott ............ G06F 11/1012
714/763
9,195,395 B1 * 11/2015 Smith .................. G06F 12/0824
(Continued)

FOREIGN PATENT DOCUMENTS

CN 101382876 3/2009
CN 102279805 12/2011
(Continued)

OTHER PUBLICATIONS

International Search Report and Written Opinion issued in Corresponding PCT Application No. PCT/CN2021/082457, dated Jun. 25, 2021 (English Translation provided).
(Continued)

*Primary Examiner* — Titus Wong
(74) *Attorney, Agent, or Firm* — NORTON ROSE FULBRIGHT US LLP

(57) ABSTRACT

The application provides a method for accessing data of a NAND FLASH file, a device and a storage medium. The method comprises: dividing a specified storage space assigned for specified NAND FLASH files into a first storage space and a second storage space; storing the management data of the specified NAND FLASH files in the first storage space, and storing the valid data of the specified NAND FLASH files in the second storage space; reading the valid data of the specified NAND FLASH files stored in the second storage space according to the management data of the specified NAND FLASH files stored in the first storage space. The present application can simplify the reading process of the specified NAND FLASH file data, reduce the reading time and improve the reading efficiency.

13 Claims, 4 Drawing Sheets

(58) Field of Classification Search
USPC .......................................................... 711/154
See application file for complete search history.

(56) References Cited

U.S. PATENT DOCUMENTS

| | | | |
|---|---|---|---|
| 2006/0085493 A1 | 4/2006 | Kim et al. | |
| 2007/0016721 A1* | 1/2007 | Gay .................... | G06F 12/0246 |
| | | | 711/170 |
| 2007/0033327 A1* | 2/2007 | Sinclair ............... | G06F 12/0246 |
| | | | 711/E12.008 |
| 2007/0143378 A1* | 6/2007 | Gorobets ............ | G06F 12/0246 |
| 2007/0143560 A1* | 6/2007 | Gorobets ............... | G11C 16/10 |
| | | | 711/170 |
| 2007/0143561 A1* | 6/2007 | Gorobets ............ | G06F 12/0246 |
| | | | 711/170 |
| 2007/0143567 A1* | 6/2007 | Gorobets ............ | G06F 12/0246 |
| | | | 711/202 |
| 2009/0210614 A1* | 8/2009 | Gorobets ............ | G06F 12/0292 |
| | | | 711/E12.001 |
| 2010/0088467 A1 | 4/2010 | Lee et al. | |
| 2010/0146197 A1* | 6/2010 | Gorobets ............ | G06F 12/0246 |
| | | | 711/E12.001 |
| 2010/0223423 A1* | 9/2010 | Sinclair ................ | G06F 3/0679 |
| | | | 711/E12.001 |
| 2011/0055297 A1 | 3/2011 | Maeda et al. | |
| 2012/0284587 A1* | 11/2012 | Yu ....................... | G06F 12/0868 |
| | | | 711/E12.008 |
| 2013/0080481 A1 | 3/2013 | Zhou et al. | |
| 2014/0229688 A1 | 8/2014 | Toyama | |
| 2016/0342366 A1* | 11/2016 | Flynn ........................ | G06F 9/54 |
| 2017/0177267 A1* | 6/2017 | Shin ....................... | G06F 3/0643 |
| 2017/0262175 A1* | 9/2017 | Kanno ................... | G06F 3/0688 |
| 2019/0087349 A1* | 3/2019 | Chung ................ | G06F 12/0246 |

FOREIGN PATENT DOCUMENTS

| | | |
|---|---|---|
| CN | 105335095 | 2/2016 |
| CN | 105468642 | 4/2016 |
| CN | 106293532 B3 | 1/2017 |
| CN | 108089821 | 5/2018 |
| CN | 109189772 | 1/2019 |
| CN | 109918234 | 6/2019 |
| CN | 110147203 | 8/2019 |

OTHER PUBLICATIONS

Extended European Search Report issued in corresponding European Application No. 21785191.4, dated Jul. 27, 2023.

* cited by examiner

METHOD AND APPARATUS FOR DATA ACCESS OF NAND FLASH FILE, AND STORAGE MEDIUM

CROSS REFERENCE TO RELATED APPLICATIONS

The present application is a national phase application under 35 U.S.C. § 371 of International Application No. PCT/CN2021/082457, filed Mar. 23, 2021, which claims the benefit of priority to Chinese patent application No. 202010263561.6 filed with the China National Intellectual Property Administration on Apr. 7, 2020 and entitled "METHOD AND APPARATUS FOR DATA ACCESS OF NAND FLASH FILE, AND STORAGE MEDIUM", each of which are incorporated herein by reference in their entirety.

TECHNICAL FIELD

The present application relates to the field of storage technology, in particular to a method for accessing data of a NAND FLASH file, device and storage medium.

BACKGROUND

NAND FLASH is a memory with power-down saving function, in which BLOCKs are used as erasing and writing units. Each BLOCK contains 64 PAGEs, and the page numbers are from 0 to 63. The length of the storage space of each page is 2 KB, which is the smallest reading and writing unit.

Intelligent home devices usually use NAND FLASH to store device parameter information, such as image parameter files under different lighting conditions, encoding and decoding firmware files of the devices, etc., and read corresponding parameter files according to the current environment information (such as the lighting value of the current environment) when booting.

At present, the intelligent home devices read NAND FLASH data files by mounting Flash file system. In the existing FLASH file system, the file data is divided into management data and valid data, and the management data of the file is divided into one or more copies according to the number of BLOCKs occupied by the valid data of the file, and stored in PAGE0 (i.e. PAGE number 0) of each BLOCK that stores the valid data of the file. In the existing FLASH file system, the management data of the file occupies a large space. When reading the valid data of the file, it is necessary to read PAGE0s of multiple BLOCKs to search the management data of the file, and read the valid data of the file according to the management data of the file. The reading process is complex, time-consuming and inefficient, which can't meet the user's demand for fast booting of intelligent home equipment.

SUMMARY

In view of this, the purpose of the present application is to provide a method for accessing data of a NAND FLASH file, a device and a storage medium, which can simplify the reading process of specified NAND FLASH file data, reduce the reading time and improve the reading efficiency.

In order to achieve the above purpose, the present application provides the following technical solutions:

a method for accessing data of a NAND FLASH file, includes:

dividing a specified storage space assigned for specified NAND FLASH files into a first storage space and a second storage space, wherein the first storage space is a continuous storage space;

storing management data of the specified NAND FLASH files in the first storage space, and storing valid data of the specified NAND FLASH files in the second storage space;

reading the valid data of the specified NAND FLASH files stored in the second storage space according to the management data of the specified NAND FLASH files stored in the first storage space.

A device for accessing data of a NAND FLASH file, comprises: a processor and a non-transitory computer readable storage medium connected with the processor via a bus;

the non-transitory computer readable storage medium storing one or more computer programs executable by the processor; when executing the one or more computer programs, the processor performs the following steps:

dividing a specified storage space assigned for specified NAND FLASH files into a first storage space and a second storage space, wherein the first storage space is a continuous storage space;

storing management data of the specified NAND FLASH files in the first storage space, and storing valid data of the specified NAND FLASH files in the second storage space;

reading the valid data of the specified NAND FLASH files stored in the second storage space according to the management data of the specified NAND FLASH files stored in the first storage space.

A non-transitory computer readable storage medium that stores instructions, which, when executed by a processor, cause the processor to perform the steps in the method for accessing data of a NAND FLASH file as described above.

According to the above technical solution, in the embodiments of the present application, the specified storage space assigned for the specified NAND FLASH files is divided into a first storage space and a second storage space, the management data and valid data of the specified NAND FLASH files are stored in the first storage space and the second storage space respectively, and the valid data of the specified NAND FLASH files is read from the second storage space according to the management data of respective specified NAND FLASH files in the first storage space. This way of storing the management data and valid data of the specified NAND FLASH files separately can simplify the reading process of the specified NAND FLASH file data, reduce the reading time and improve the reading efficiency.

BRIEF DESCRIPTION OF THE DRAWINGS

In order to explain the embodiments of the present application and the technical solutions of the prior art more clearly, the following briefly introduces the embodiments and the drawings required in the prior art. Obviously, the drawings in the following description are only some embodiments of the present application, and those of ordinary skill in the art may also obtain other drawings according to these drawings.

DETAILED DESCRIPTION

In order to make the objectives, technical solutions and advantages of the present application more clearly, the present application will be further explained in detail with reference to the attached drawings and embodiments. Obviously, the described embodiments are only a part of the embodiments of the present application, but not all of them. All other embodiments obtained by those of ordinary skill in the art based on the embodiments in the present application fall within the protection scope of the present application.

Figure 1:
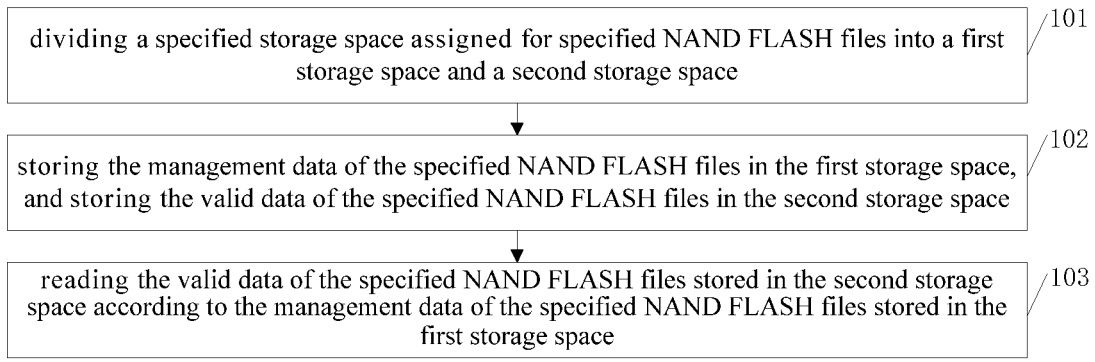
FIG. 1 is a flowchart of a method for accessing data of a NAND FLASH file according to embodiment 1 of the present application.

Referring to FIG. 1, which is a flowchart of a method for accessing data of a NAND FLASH file according to embodiment 1 of the present application, and as shown in FIG. 1, the method includes the following steps:

Step 101: dividing a specified storage space assigned for specified NAND FLASH files into a first storage space and a second storage space.

The first storage space is a continuous storage space, and the second storage space may be a continuous storage space or a non-continuous storage space. The continuous storage space herein means that the storage addresses in the storage space are continuous in a certain order, wherein the storage addresses may refer to physical storage addresses or logical storage addresses, and the certain order may be different according to different application scenarios, exemplarily, may be continuous on value, exemplarily, storage address 1 is continuous with storage address 2, storage address 2 is continuous with storage address 3, and so on. It may also refer to being continuous in a pre-established sequence, exemplarily, assuming that a sequence {storage address 1, storage address 3, storage address 4, storage address 2} is pre-established, storage address 1 is continuous with storage address 3, storage address 3 is continuous with storage address 4, and storage address 4 is continuous with storage address 2.

In the present embodiment, the specified NAND FLASH may refer to all NAND FLASH files or some NAND FLASH files that satisfy the specified conditions. The specified conditions may be set according to the actual needs, exemplarily, some NAND FLASH files that need to be read quickly may be called specified NAND FLASH files, and a specified storage space may be assigned for these specified NAND FLASH files in advance to store the management data and valid data of these specified NAND FLASH files.

Step 102: storing management data of the specified NAND FLASH files in the first storage space, and storing the valid data of the specified NAND FLASH files in the second storage space.

In the present embodiment, the management data of the specified NAND FLASH files includes information used to indicate the storage location of the specified NAND FLASH files.

Step 103: reading the valid data of the specified NAND FLASH files stored in the second storage space according to the management data of the specified NAND FLASH files stored in the first storage space.

According to the embodiment shown in FIG. 1 that in the present embodiment, the management data and valid data of the specified NAND FLASH files are stored in the first storage space and the second storage space respectively. Since the first storage space is a continuous storage space, when reading the specified NAND FLASH files, the management data of the files only needs to be read once in the first storage space, and then the valid data of the files may be read from the second storage space according to the management data of the files. Compared with the existing one BLOCK that stores management data and valid data at the same time, which causes that multiple times of reading of the management data and the valid data of the file are required in the file reading process, the reading process in the present embodiment is simple, so the reading time may be effectively reduced and the reading efficiency may be improved.

Figure 2:
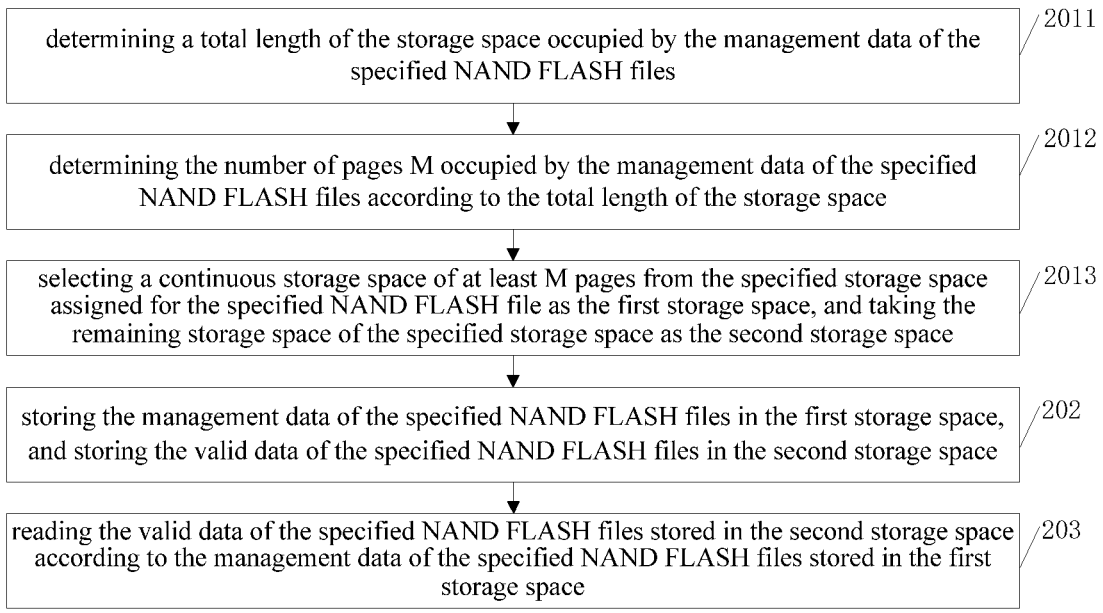
FIG. 2 is a flowchart of a method for accessing data of a NAND FLASH file according to embodiment 2 of the present application.

Referring to FIG. 2, which is a flowchart of a method for accessing data of a NAND FLASH file according to embodiment 2 of the present application, and as shown in FIG. 2, the method comprises the following steps:

Step 2011: determining a total length of the storage space occupied by the management data of the specified NAND FLASH files.

In the present embodiment, the length of the management data of respective specified NAND FLASH files is known. Said total length of the storage space occupied by the management data of the specified NAND FLASH files is the sum of the lengths of the management data of all the specified NAND FLASH files. For example, assuming that the management data of each specified NAND FLASH file has the same length of 20 byte, if there are 100 specified NAND FLASH files, the total length of the storage space occupied by the management data of the specified NAND FLASH files is 2000 byte.

Step 2012: determining the number of pages M occupied by the management data of the specified NAND FLASH files according to the total length of the storage space.

Where M is a positive integer.

The number of pages M occupied by the management data of the specified NAND FLASH files is determined according to the total length of the storage space, the following formula $M=\lceil L1/L \rceil$ may be used, where $\lceil\ \rceil$ means rounding up, L1 is the total length of said storage space, and L is the length of the storage space of one PAGE (in the prior art, the length of the storage space of one PAGE may be 2048 bytes). Take L1=2000 bytes as an example, $M=\lceil 2000/2048 \rceil=1$.

Step 2013: selecting a continuous storage space of at least M pages from the specified storage space assigned for the specified NAND FLASH file, where M pages of continuous storage space refers to the storage space composed of M pages with continuous storage addresses, and taking the continuous storage space as the first storage space and the remaining storage space of the specified storage space as the second storage space, where the storage address may refer to a physical storage address or a logical storage address, and continuous can be continuous in value, or it can mean continuous in a pre-established order.

The remaining storage space is other storage space in the specified storage space except the continuous storage space.

In the present embodiment, the specific method of selecting a continuous storage space of at least M pages from the specified storage space assigned for the specified NAND FLASH files may be as follows: selecting a continuous storage space of at least M pages at the beginning of the specified storage space; or, selecting a continuous storage space of at least M pages in a reverse direction at the end of the specified storage space.

The reverse direction refers to the direction from the end to the start, and selecting in a reverse direction refers to preferentially selecting the storage space closer to the end.

Figure 3:
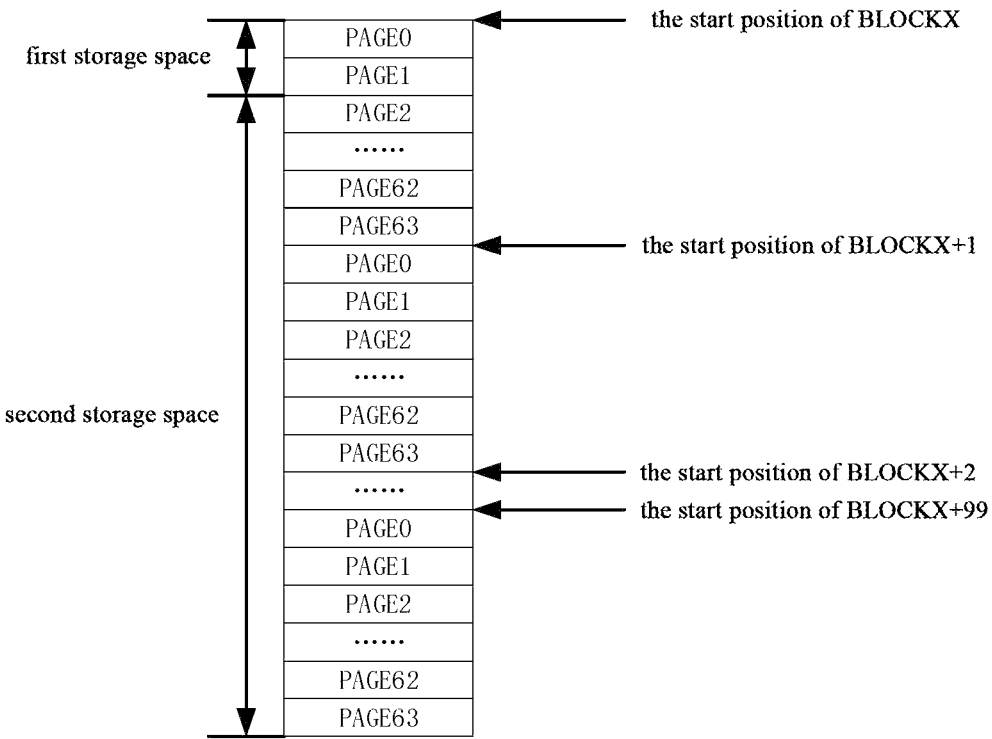
FIG. 3 is a schematic diagram of specified storage space division according to the embodiments of the present application.

For example, as shown in FIG. 3, assuming that the specified storage space is 100 blocks from BLOCKX to BLOCKX+99, where x is any natural number and M=2, the first two PAGEs, PAGE0 and PAGE1, in BLOCKX may be selected as the first storage space, and correspondingly, PAGE2 to PAGE63 and BLOCKX+1 to BLOCKX+99 in BLOCKX may be selected as the second storage space. In addition, in actual implementation, the last two PAGEs, PAGE62 and PAGE63, in BLOCK99 can also be selected as the first storage space, and correspondingly, BLOCKX to BLOCKX+98 and PAGE0 to PAGE61 in BLOCKX+99 may be selected as the second storage space.

In addition, in practical application, a continuous storage space of at least M pages in the middle of the specified storage space may be selected, and the continuous storage space may be used as the first storage space and the remaining storage space of the specified storage space may be used as the second storage space. Exemplarily, it is assumed that the specified storage space is 100 blocks from BLOCKX to BLOCKX+99, and M=2, PAGE4 and PAGE5 in BLOCKX+5 may be selected as the first storage space, and correspondingly, PAGES in BLOCKX to BLOCKX+5 and PAGE6 in BLOCKX+5 to BLOCKX+99 may be selected as the second storage space.

The above steps 2011 to 2013 may be a possible implementation of the step 101 shown in FIG. 1, and in other possible embodiments, the step 101 shown in FIG. 1 may also be implemented in other ways.

Step 202: storing the management data of the specified NAND FLASH files in the first storage space, and storing the valid data of the specified NAND FLASH files in the second storage space;

Step 203: reading the valid data of the specified NAND FLASH files stored in the second storage space according to the management data of the specified NAND FLASH files stored in the first storage space.

The above steps 202 and 203 are the same as the steps 101 and 102 shown in FIG. 1 in the implementation principle, and will not be described again.

According to the embodiment shown in FIG. 2, compared with the embodiment shown in FIG. 1, besides the advantages of the embodiment shown in FIG. 1, in the present embodiment, the number of pages M required to be occupied by the management data of the NAND FLASH files is determined by calculating the total length of the storage space occupied by the management data of the specified NAND FLASH files, and then, no less than M pages of continuous storage space in the specified storage space is selected as the first storage space to ensure that the first storage space can store the management data of all the specified NAND FLASH files.

Figure 4:
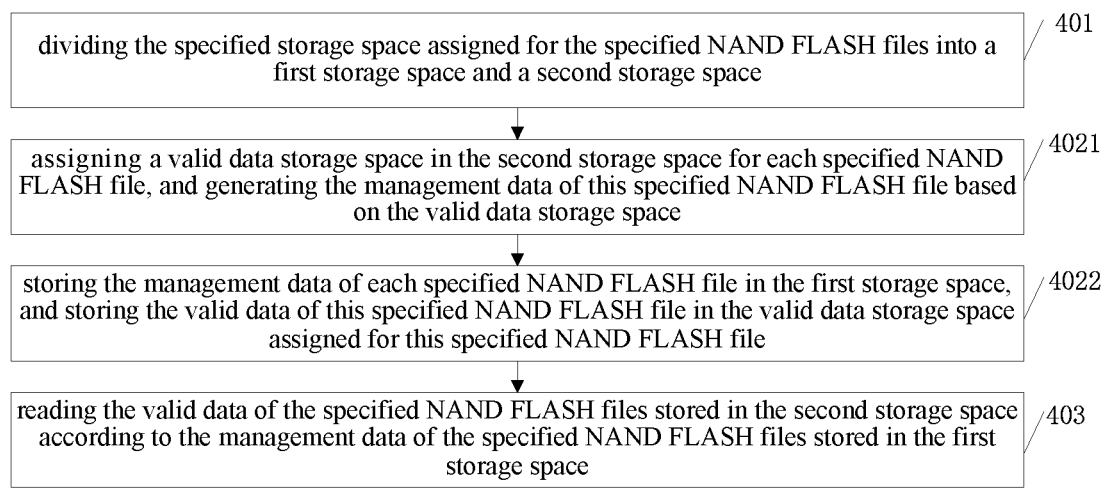
FIG. 4 is a flowchart of a method for accessing data of a NAND FLASH file according to embodiment 3 of the present application.

Refer to FIG. 4, which is a flowchart of a method for accessing data of a NAND FLASH file according to embodiment 3 of the present application. As shown in FIG. 4, the method comprises the following steps:

Step 401: dividing a specified storage space assigned for the specified NAND FLASH files into a first storage space and a second storage space.

Step 4021: as signing a valid data storage space in the second storage space for each specified NAND FLASH file, and generating the management data of this specified NAND FLASH file based on the valid data storage space.

In the present embodiment, the management data may include information such as a file name, a start position and a file length.

In the present embodiment, said as signing the valid data storage space in the second storage space for each specified NAND FLASH file, and generating the management data of this specified NAND FLASH file based on the valid data storage space may include the following steps:

S11, determining the number of pages N required for the valid data of this specified NAND FLASH file, selecting an unassigned continuous storage space of N pages from the second storage space as the valid data storage space of this specified NAND FLASH file;

S12, setting the file name, the start position and the file length of the management data of this specified NAND FLASH file as a file name of this specified NAND FLASH file, a start position of the valid data storage space of this specified NAND FLASH file and a valid data length of this specified NAND FLASH file, respectively.

In the above step S11, to determine the number of pages N need to be occupied by the valid data of this specified NAND FLASH file, the following formula $N=\lceil L2/L \rceil$ may be used, where L2 is the valid data length of this specified NAND FLASH file and L is the length of the storage space of one PAGE (in the prior art, the length of the storage space of one page may be 2048 bytes). Take L2=4098 bytes as an example, $N=\lceil 4098/2048 \rceil=3$.

Figure 5:
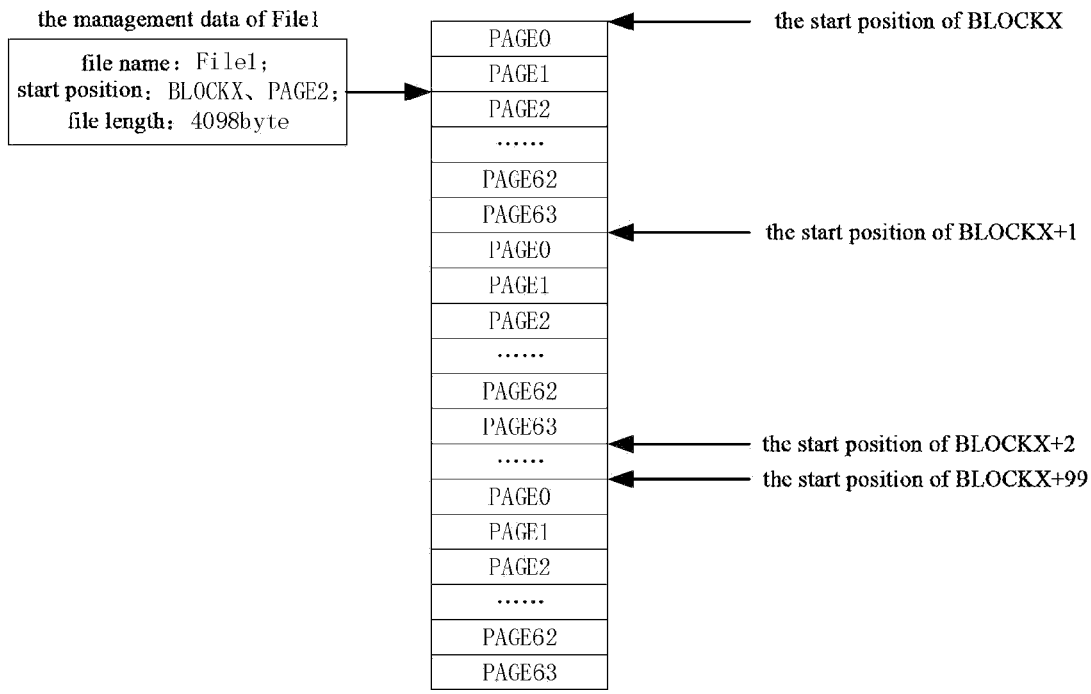
FIG. 5 is an example diagram of a specified NAND FLASH file storage provided by the embodiments of the present application.

After determining the number of pages N need to be occupied by the valid data of this specified NAND FLASH file, the unassigned continuous storage space of N pages may be selected from the second storage space and the continuous storage space may be determined as the valid data storage space of this specified NAND FLASH file, wherein the unassigned continuous storage space of N pages refer to N pages of continuous storage space that have not been specified as the valid data storage space of any NAND FLASH file. For example, assuming that the specified storage spaces are BLOCKX to BLOCKX+99, and the first two PAGEs, PAGE0 and PAGE1 in BLOCKX have been selected as the first storage spaces, and PAGE2 to PAGE63 in BLOCKX and BLOCKX+1 to BLOCKX+99 have been selected as the second storage spaces, if no valid data storage space has been assigned to any files in the second storage space, the continuous storage space of PAGE2 to PAGE4 in BLOCKX can be assigned to this specified NAND FLASH file as the valid data storage space thereof, specifically refer to File1 shown in FIG. 5.

Step 4022: storing the management data of each specified NAND FLASH file in the first storage space, and storing valid data of this specified NAND FLASH file in the valid data storage space assigned for this specified NAND FLASH file.

In the present embodiment, the storage location of the management data of each specified NAND FLASH file in the first storage space may be random, or it may be stored in the first storage space in a predetermined order, such as alphabetical order of file names, which is not limited in the present application.

The above steps 4021 to 4022 are one possible implementation manner of the step 102 shown in FIG. 1, and in other possible embodiments, the step 102 shown in FIG. 1 may also be implemented in different implementation manners, which is not limited in the present application.

Step 403: reading the valid data of the specified NAND FLASH files stored in the second storage space according to the management data of the specified NAND FLASH files stored in the first storage space.

The above steps 401 and 403 are the same as steps 101 and 103 shown in FIG. 1 in the implementation principles, respectively, and will not be repeated here.

According to the embodiment shown in FIG. 4, compared with the embodiment shown in FIG. 1, besides the advantages of the embodiment shown in FIG. 1, the present embodiment assigns the valid data storage space for the specified NAND FLASH file in the first, so that the start position of the management data of the specified NAND FLASH file and the storage position of the valid data of the specified NAND FLASH file are determined accordingly, and the subsequent orderly storage of the management data and valid data of the specified NAND FLASH file may be realized.

Figure 6:
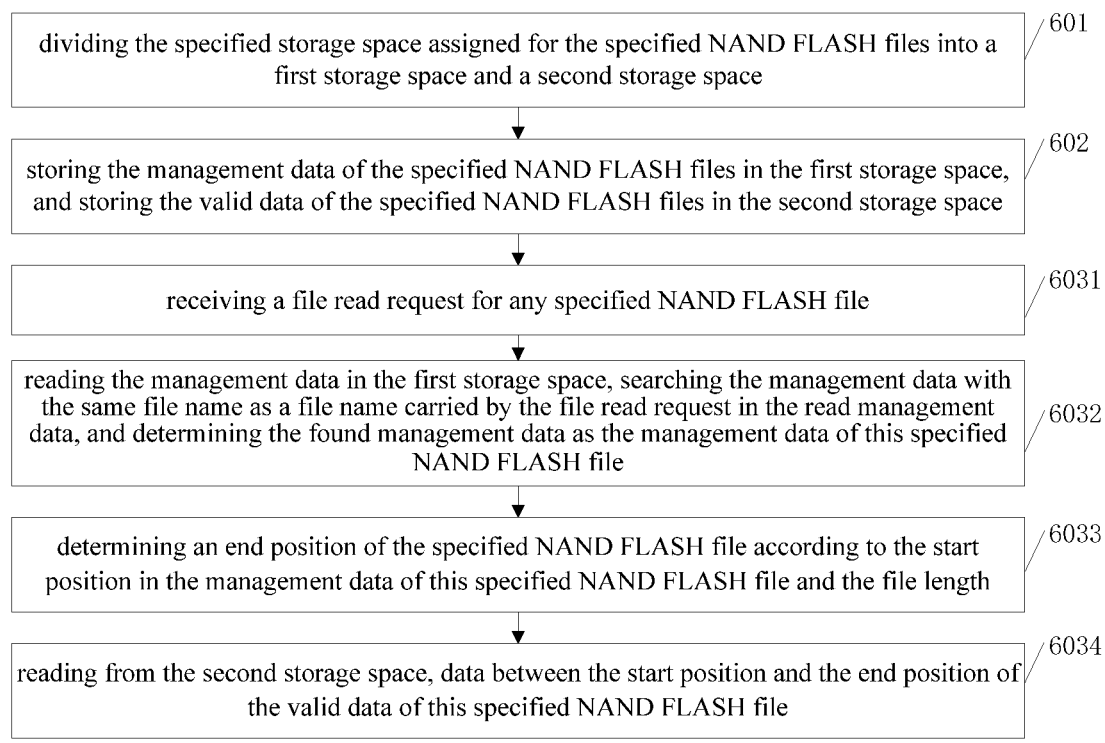
FIG. 6 is a flowchart of a method for accessing data of a NAND FLASH file according to embodiment 4 of the present application.

Referring to FIG. 6, which is a flowchart of the NAND FLASH file data access method in embodiment 4 of the present application. As shown in FIG. 6, the method includes the following steps:

Step 601: dividing the specified storage space assigned for the specified NAND FLASH files into a first storage space and a second storage space.

Step 602: storing the management data of the specified NAND FLASH files in the first storage space, and storing the valid data of the specified NAND FLASH files in the second storage space.

The above steps 601 to 602 are the same as the steps 101 to 102 shown in FIG. 1 in the implementation principle, and will not be described again.

Step 6031: receiving a file read request for any specified NAND FLASH file.

In the present embodiment, the file read request carries the file name of the file to be read.

Step 6032: reading the management data in the first storage space, searching management data with the same file name as a file name carried by the file read request from the read management data, and determining the found management data as management data of this specified NAND FLASH file.

In the present embodiment, all the management data in the first storage space may be read out, and then the file name of the file to be read is searched in the read management data, and the found corresponding management data is the management data of the file to be read.

Step 6033: determining an end position of this specified NAND FLASH file according to the start position in the management data of this specified NAND FLASH file and the file length.

In the present embodiment, the start position in the management data comprises a start block position and a start page position. The end position comprises an end block position and an end page position. Since the start block position is used to indicate the block to which the start position belongs, and the start page position is used to indicate the page to which the start position belongs. Hereinafter, for convenience of description, the start block position is referred to as the start block and the start page position is referred to as the start page. Similarly, since the end block position is used to indicate the block to which the end position belongs and the end page position is used to indicate the page to which the end position belongs. Hereinafter, for convenience of description, the end block position is referred to as the end block and the end page position is referred to as the end page.

The end position of the specified NAND FLASH file is determined according to the start position in the management data of this specified NAND FLASH file and file length, and the specific method is as follows:

S21, determining the number of PAGEs occupied by the valid data of this specified NAND FLASH file according to the file length of the management data of this specified NAND FLASH file (i.e. the valid data length of this specified NAND FLASH file).

S22, determining the end position of this specified NAND FLASH file according to the number of PAGEs and the start position in the management data of this specified NAND FLASH file.

For example, assuming that the file length of the management data of this specified NAND FLASH file is 3000 bytes, and the length of the storage space of one PAGE is 2048 bytes, the number of pages occupied by the valid data of this specified NAND FLASH file may be determined to be 2. Assuming that the start position of this specified NAND FLASH file is PAGE63 of BLOCKX (the start BLOCK, the start PAGE), the end position of this specified NAND FLASH file may be determined as BLOCKX+1 (end BLOCK) and PAGE1 (end PAGE) according to the number of pages occupied by the valid data of this specified NAND FLASH file is 2 and the start position of this specified NAND FLASH file.

Step 6034, reading from the second storage space, data between the start position and the end position of the valid data of this specified NAND FLASH file.

Here, the start position of the valid data of this specified NAND FLASH file is the start position included in the management data of this specified NAND FLASH file. Wherein, the data read during reading includes the data at the start position and at the end position.

In the present embodiment, reading from the second storage space, data between the start position and the end position of the valid data of this specified NAND FLASH file specifically includes:

S31, when the start block of the start position is the same as the end block of the end position, performing continuous multi-page reading on the data between the start page of the start position and the end page of the end position from the start block of the start position;

S33, when the start block of the start position is different from the end block of the end position, performing continuous multi-page reading on data between the start page of the start position and the end page of the start block of the start position from the start block of the start position, then sequentially reading data between a next block of the start block of the start position and a previous block of the ending block of the end position block-by-block, and finally performing continuous multi-page reading on data between a first page of the end block of the end position and an end page of the end position from the end block of the end position.

In the above step S31, the start block of the start position is the same as the end block of the end position, which indicates that the start page and the end page of this specified NAND FLASH file are on the same block, and the data from the start page to the end page can be directly read once (continuous multi-page reading).

In the above step S32, the start block of the start position is different from the end block of the end position, indicating that the start page and the end page of the specified NAND FLASH file are not on the same BLOCK, and the valid data of the specified NAND FLASH file is stored across BLOCKs. In this case, the data needs to be read multiple times. Firstly, performing reading on the valid data on the first BLOCK (i.e., the start BLOCK). Secondly, performing reading on the valid data across several BLOCKs (i.e., respective BLOCKs between the start BLOCK and the end BLOCK, and excluding the start BLOCK and the end BLOCK), and finally performing reading on the valid data on the last block (i.e., the end block). For example, the storage of the valid data of this specified NAND FLASH file is as follows: PAGE63 in BLOCKX, PAGE0-PAGE63 in BLOCKX+1 and PAGE0 in BLOCKX+2, that is, the start BLOCK is BLOCKX, the start PAGE is PAGE63, the end BLOCK is BLOCKX+2, and the end PAGE is PAGE0. The reading on the valid data of this specified NAND FLASH file may be performed in three times: the first time) reading PAGE63 in BLOCKX, the second time) reading BLOCKX+1 in whole block, and the third time) reading PAGE0 in BLOCKX+2.

The above steps 6031 to 6034 are a possible implementation of the step 103 shown in FIG. 1, and in other possible embodiments, the step 103 shown in FIG. 1 may also be implemented in other ways, which is not limited by the present embodiment.

According to the embodiment shown in FIG. 6, compared with the embodiment shown in FIG. 1, besides the advantages of the embodiment shown in FIG. 1, the present embodiment determines the end position of this specified NAND FLASH file according to the start position in the management data of this specified NAND FLASH file and file length, so as to quickly locate the storage position of the valid data of this specified NAND FLASH file and performing reading on the valid data block by block, which may further improve the reading speed and reading efficiency of the NAND FLASH file.

The method for accessing data of a NAND FLASH file in the embodiment of the present application is described in detail above, and the embodiment of the present application also provides a device for accessing data of a NAND FLASH file, which will be described in detail below with reference to FIG. 7.

Figure 7:
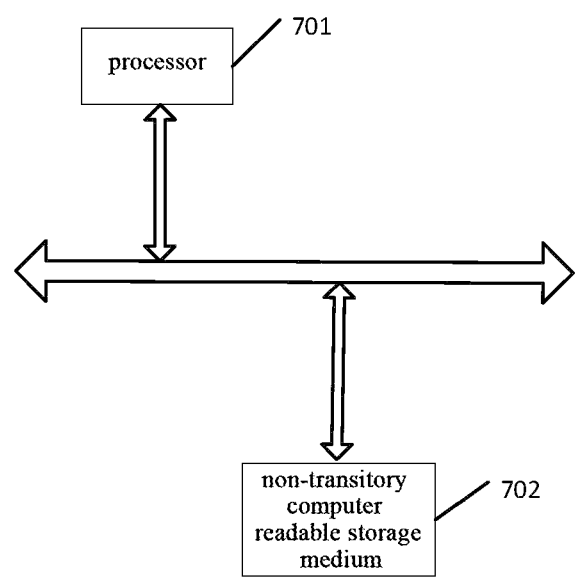
FIG. 7 is a structural diagram of a device for accessing data of a NAND FLASH file according to an embodiment of the present application.

Refer to FIG. 7, which is a schematic structural diagram of a device for accessing data of a NAND FLASH file according to an embodiment of the present application. As shown in FIG. 7, the device comprises a processor 701 and a non-transitory computer readable storage medium 702 connected to the processor 701 via a bus.

The non-transitory computer readable storage medium 702 stores one or more computer programs that may be executed by the processor 701; when executing the one or more computer programs, the processor 701 performs the following steps:

dividing a specified storage space assigned for specified NAND FLASH files into a first storage space and a second storage space, wherein the first storage space is a continuous storage space;

storing management data of the specified NAND FLASH files in the first storage space, and storing valid data of the specified NAND FLASH files in the second storage space;

dividing a specified storage space assigned for specified NAND FLASH files into a first storage space and a second storage space, wherein the first storage space is a continuous storage space;

storing management data of the specified NAND FLASH files in the first storage space, and storing valid data of the specified NAND FLASH files in the second storage space;

In the device shown in FIG. 7, the processor 701 divides the specified storage space assigned for the specified NAND FLASH files into the first storage space and the second storage space, includes:

determining a total length of storage space occupied by management data of the specified NAND FLASH files;

determining the number of pages M occupied by the management data of the specified NAND FLASH files according to the total length of the storage space;

selecting a continuous storage space of at least M pages from the specified storage space as the first storage space, and taking the remaining storage space of the specified storage space as the second storage space.

In the device shown in FIG. 7, the processor 701, when selecting a continuous storage space of at least M pages from the specified storage space, is configured for:

selecting a continuous storage space of at least M pages at the beginning of the specified storage space; or, selecting a continuous storage space of at least M pages in a reverse direction at the end of the specified storage space.

In the device shown in FIG. 7, the processor 701 stores the management data of the specified NAND FLASH files in the first storage space and stores the valid data of the specified NAND FLASH files in the second storage space, includes:

assigning a valid data storage space in the second storage space for each specified NAND FLASH file, and generating management data of this specified NAND FLASH file based on the valid data storage space;

storing the management data of each specified NAND FLASH file in the first storage space, and storing valid data of this specified NAND FLASH file in the valid data storage space assigned for this specified NAND FLASH file.

In the device shown in FIG. 7, the management data includes a file name, a start position and a file length;

The processor 701 assigns a valid data storage space in the second storage space for each specified NAND FLASH file, and generates the management data of this specified NAND FLASH file based on the valid data storage space, includes:

determining the number of pages N required for the valid data of this specified NAND FLASH file, selecting an unassigned continuous storage space of N pages from the second storage space as the valid data storage space of this specified NAND FLASH file;

setting the file name, the start position and the file length of the management data of this specified NAND FLASH file as a file name of this specified NAND FLASH file, a start position of the valid data storage space of this specified NAND FLASH file and a valid data length of this specified NAND FLASH file, respectively.

In the device shown in FIG. 7, the processor 701 reads the valid data of the specified NAND FLASH file stored in the second storage space according to the management data of the specified NAND FLASH file stored in the first storage space, includes:

receiving a file read request for any specified NAND FLASH file;

reading the management data in the first storage space, searching management data with the same file name as a file name carried by the file read request from the read management data, and determining the found management data as management data of this specified NAND FLASH file;

determining an end position of this specified NAND FLASH file according to the start position in the management data of this specified NAND FLASH file and the file length;

reading from the second storage space, data between the start position and the end position of the valid data of this specified NAND FLASH file.

In the device shown in FIG. 7, the start position includes a start block and a start page;

the end position includes an end block and an end page;

the processor 701 reads from the second storage space, data between the start position and the end position of the valid data of this specified NAND FLASH file, includes:

when the start block of the start position is the same as the end block of the end position, performing continuous multi-page reading on the data between the start page of the start position and the end page of the end position from the start block of the start position;

when the start block of the start position is different from the end block of the end position, performing continuous multi-page reading on data between the start page of the start position and the end page of the start block of the start position from the start block of the start position, then sequentially reading data between a next block of the start block of the start position and a previous block of the ending block of the end position block-by-block, and finally performing continuous multi-page reading on data between a first page of the end block of the end position and an end page of the end position from the end block of the end position.

An embodiment of the present application also provides a non-transitory computer readable storage medium storing instructions that, when executed by a processor, cause the processor to perform the steps in the method for accessing data of a NAND FLASH file, as shown in the above-mentioned FIG. 1, FIG. 2, FIG. 4 or FIG. 6.

In yet another embodiment provided by the present application, there is also provided a computer program product containing instructions, which, when run on a computer, causes the computer to perform the steps in the method for accessing data of a NAND FLASH file, as shown in the above-mentioned FIG. 1, FIG. 2, FIG. 4 or FIG. 6.

The above is only preferred embodiments of the present application, and are not intended to limit the present application. Any modification, equivalent replacements, improvement, etc. made within the spirit and principle of the present application should be included in the scope of protection of the present application.

What is claimed is:

1. A method for accessing data of a NAND FLASH file, wherein the method comprises:

dividing a specified storage space assigned for specified NAND FLASH files into a first storage space and a second storage space, wherein the first storage space is a continuous storage space;

storing management data of the specified NAND FLASH files in the first storage space, and storing valid data of the specified NAND FLASH files in the second storage space;

reading the valid data of the specified NAND FLASH files stored in the second storage space according to the management data of the specified NAND FLASH files stored in the first storage space, wherein, the management data of the specified NAND FLASH files includes information used to indicate the storage location of the specified NAND FLASH files, wherein, dividing the specified storage space assigned for the specified NAND FLASH files into the first storage space and the second storage space, comprises:

determining a total length of storage space occupied by management data of the specified NAND FLASH files;

determining the number of pages M occupied by the management data of the specified NAND FLASH files according to the total length of the storage space; and selecting a continuous storage space of at least M pages from the specified storage space as the first storage space, wherein the continuous storage space of at least M pages refers to a storage space composed of M pages with continuous storage addresses, and taking the remaining storage space of the specified storage space as the second storage space, wherein the remaining storage space is other storage space in the specified storage space except the continuous storage space.

2. The method according to claim 1, wherein, the continuous storage space of at least M pages is selected from the specified storage space in the following way:

selecting a continuous storage space of at least M pages at the beginning of the specified storage space; or, selecting a continuous storage space of at least M pages in a reverse direction at the end of the specified storage space.

3. The method according to claim 1, wherein, storing the management data of the specified NAND FLASH files in the first storage space, and storing the valid data of the specified NAND FLASH files in the second storage space, comprises:

assigning a valid data storage space in the second storage space for each specified NAND FLASH file, and generating management data of this specified NAND FLASH file based on the valid data storage space;

storing the management data of each specified NAND FLASH file in the first storage space, and storing valid data of this specified NAND FLASH file in the valid data storage space assigned for this specified NAND FLASH file.

4. The method according to claim 3, wherein, the management data comprises a file name, a start position and a file length;

assigning the valid data storage space in the second storage space for each specified NAND FLASH file, and generating management data of this specified NAND FLASH file based on the valid data storage space, comprises:

determining the number of pages N required for the valid data of this specified NAND FLASH file, selecting an unassigned continuous storage space of N pages from the second storage space as the valid data storage space of this specified NAND FLASH file;

setting the file name, the start position and the file length of the management data of this specified NAND FLASH file as a file name of this specified NAND FLASH file, a start position of the valid data storage space of this specified NAND FLASH file and a valid data length of this specified NAND FLASH file, respectively.

5. The method according to claim 4, wherein, reading the valid data of the specified NAND FLASH files stored in the second storage space according to the management data of the specified NAND FLASH files stored in the first storage space, comprises:

receiving a file read request for any specified NAND FLASH file;

reading the management data in the first storage space, searching management data with the same file name as a file name carried by the file read request from the read management data, and determining the found management data as management data of this specified NAND FLASH file;

determining an end position of this specified NAND FLASH file according to the start position in the management data of this specified NAND FLASH file and the file length;

reading from the second storage space, data between the start position and the end position of the valid data of this specified NAND FLASH file.

6. The method according to claim 5, wherein:

the start position comprises a start block and a start page;

the end position comprises an end block and an end page;

reading from the second storage space, data between the start position and the end position of the valid data of this specified NAND FLASH file, comprises:

when the start block of the start position is the same as the end block of the end position, performing continuous multi-page reading on the data between the start page of the start position and the end page of the end position from the start block of the start position;

when the start block of the start position is different from the end block of the end position, performing continuous multi-page reading on data between the start page of the start position and the end page of the start block of the start position from the start block of the start position, then sequentially reading data between a next block of the start block of the start position and a previous block of the ending block of the end position block-by-block, and finally performing continuous multi-page reading on data between a first page of the end block of the end position and an end page of the end position from the end block of the end position.

7. A device for accessing data of a NAND FLASH file, wherein the device comprises: a processor, and a non-transitory computer readable storage medium connected with the processor via a bus;

the non-transitory computer readable storage medium storing one or more computer programs executable by the processor; when executing the one or more computer programs, the processor performs the following steps:

dividing a specified storage space assigned for specified NAND FLASH files into a first storage space and a second storage space, wherein the first storage space is a continuous storage space;

storing management data of the specified NAND FLASH files in the first storage space, and storing valid data of the specified NAND FLASH files in the second storage space;

reading the valid data of the specified NAND FLASH files stored in the second storage space according to the management data of the specified NAND FLASH files stored in the first storage space, wherein, the management data of the specified NAND FLASH files includes information used to indicate the storage location of the specified NAND FLASH files, wherein, the processor divides the specified storage space assigned for the specified NAND FLASH files into the first storage space and the second storage space, comprises:

determining a total length of storage space occupied by management data of the specified NAND FLASH files;

determining the number of pages M occupied by the management data of the specified NAND FLASH files according to the total length of the storage space; and selecting a continuous storage space of at least M pages from the specified storage space as the first storage space, wherein the continuous storage space of at least M pages refers to a storage space composed of M pages with continuous storage addresses, and taking the remaining storage space of the specified storage space as the second storage space, wherein the remaining storage space is other storage space in the specified storage space except the continuous storage space.

8. The device according to claim 7, wherein, the processor, when selecting a continuous storage space of at least M pages from the specified storage space, is configured for:

selecting a continuous storage space of at least M pages at the beginning of the specified storage space; or, selecting a continuous storage space of at least M pages in a reverse direction at the end of the specified storage space.

9. The device according to claim 7, wherein, the processor stores the management data of the specified NAND FLASH files in the first storage space and stores the valid data of the specified NAND FLASH files in the second storage space, comprises:

assigning a valid data storage space in the second storage space for each specified NAND FLASH file, and generating management data of this specified NAND FLASH file based on the valid data storage space;

storing the management data of each specified NAND FLASH file in the first storage space, and storing valid data of this specified NAND FLASH file in the valid data storage space assigned for this specified NAND FLASH file.

10. The device according to claim 9, wherein, the management data comprises a file name, a start position and a file length;

the processor assigns the valid data storage space in the second storage space for each specified NAND FLASH file, and generates the management data of this specified NAND FLASH file based on the valid data storage space, comprises:

determining the number of pages N required for the valid data of this specified NAND FLASH file, selecting an unassigned continuous storage space of N pages from the second storage space as the valid data storage space of this specified NAND FLASH file;

setting the file name, the start position and the file length of the management data of this specified NAND FLASH file as a file name of this specified NAND FLASH file, a start position of the valid data storage space of this specified NAND FLASH file and a valid data length of this specified NAND FLASH file, respectively.

11. The device according to claim 10, wherein, the processor reads the valid data of the specified NAND FLASH files stored in the second storage space according to the management data of the specified NAND FLASH files stored in the first storage space, comprises:

receiving a file read request for any specified NAND FLASH file;

reading the management data in the first storage space, searching management data with the same file name as a file name carried by the file read request from the read management data, and determining the found management data as management data of this specified NAND FLASH file;

determining an end position of this specified NAND FLASH file according to the start position in the management data of this specified NAND FLASH file and the file length;

reading from the second storage space, data between the start position and the end position of the valid data of this specified NAND FLASH file.

12. The device according to claim 11, wherein, the start position comprises a start block and a start page;

the end position comprises an end block and an end page;

the processor reads from the second storage space, data between the start position and the end position of the valid data of this specified NAND FLASH file, comprises:

when the start block of the start position is the same as the end block of the end position, performing continuous multi-page reading on the data between the start page of the start position and the end page of the end position from the start block of the start position;

when the start block of the start position is different from the end block of the end position, performing continuous multi-page reading on data between the start page of the start position and the end page of the start block of the start position from the start block of the start position, then sequentially reading data between a next block of the start block of the start position and a previous block of the ending block of the end position block-by-block, and finally performing continuous multi-page reading on data between a first page of the end block of the end position and an end page of the end position from the end block of the end position.

13. A non-transitory computer-readable storage medium that stores instructions, which, when executed by a processor, cause the processor to perform the steps in the method for accessing data of a NAND FLASH file according to claim 1.

* * * * *